United States Patent
Zhang et al.

(10) Patent No.: US 7,825,605 B2
(45) Date of Patent: Nov. 2, 2010

(54) DA/AC CONVERT FOR DRIVING COLD CATHODE FLUORESCENT LAMP

(75) Inventors: Junming Zhang, Hanzhou (CN); Xiaopeng Dong, Shenzhen (CN); Yuancheng Ren, Hangzhou (CN); Wei Chen, Campbell, CA (US); Eric Yang, Saratoga, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 804 days.

(21) Appl. No.: 11/582,916

(22) Filed: Oct. 17, 2006

(65) Prior Publication Data

US 2007/0086217 A1    Apr. 19, 2007

(30) Foreign Application Priority Data

Oct. 17, 2005    (CN)    .................. 2005 1 0114121

(51) Int. Cl.
H05B 41/14    (2006.01)

(52) U.S. Cl. .................. 315/224; 315/209 PZ; 315/307; 310/318

(58) Field of Classification Search ........... 315/209 PZ, 315/307, 308, 291, 246, 247; 310/316.01, 310/318, 319; 345/102; 363/15–17, 95, 363/97

See application file for complete search history.

(56) References Cited

U.S. PATENT DOCUMENTS

| | | | |
|---|---|---|---|
| 5,528,192 A | 6/1996 | Agiman | |
| 5,615,093 A | 3/1997 | Nalbant | |
| 5,619,402 A | 4/1997 | Liu | |
| 5,705,877 A * | 1/1998 | Shimada | .................. 310/318 |
| 5,757,173 A | 5/1998 | Agiman | |
| 5,892,336 A | 4/1999 | Lin et al. | |
| 5,923,129 A | 7/1999 | Henry | |
| 5,930,121 A | 7/1999 | Henry | |
| 6,013,969 A * | 1/2000 | Noma et al. | ................ 310/318 |
| 6,104,146 A | 8/2000 | Chou et al. | |
| 6,198,234 B1 | 3/2001 | Henry | |
| 6,198,245 B1 | 3/2001 | Du et al. | |
| 6,259,615 B1 | 7/2001 | Lin | |
| 6,307,765 B1 | 10/2001 | Choi | |
| 6,396,722 B2 | 5/2002 | Lin | |
| 6,459,602 B1 | 10/2002 | Lipcsei | |
| 6,469,922 B2 | 10/2002 | Choi | |

(Continued)

OTHER PUBLICATIONS

Fukunaga, H., H. Kakehashi, H. Ogasawara, Y. Ohta, "Effect of Dimension on Characteristics of Rosen-Type Piezoelectric Transformer", IEEE PESC'98, pp. 1504-1510.

(Continued)

*Primary Examiner*—Douglas W Owens
*Assistant Examiner*—Ephrem Alemu
(74) *Attorney, Agent, or Firm*—Perkins Coie LLP

(57) ABSTRACT

The present invention discloses a DC/AC converter in the backlight power supply system using cold cathode fluorescent lamp (CCFL). The DC/AC converter comprises a front end DC/DC converter, a full-bridge or half bridge inverter, and a piezoelectric transformer. Even with a wide range of input voltages, the front end DC/DC converter produces a predetermined DC voltage or a DC voltage with a predetermined small range and the cascaded inverter operates with a switching frequency close to the resonant frequency of the piezoelectric transformer, which helps the backlight power supply system achieve high efficiency.

30 Claims, 8 Drawing Sheets

U.S. PATENT DOCUMENTS

| | | | |
|---|---|---|---|
| 6,501,234 B2 | 12/2002 | Lin et al. |
| 6,507,173 B1 | 1/2003 | Spiridon et al. |
| 6,515,881 B2 | 2/2003 | Chou et al. |
| 6,531,831 B2 | 3/2003 | Chou et al. |
| 6,559,606 B1 | 5/2003 | Chou et al. |
| 6,570,344 B2 | 5/2003 | Lin |
| 6,654,268 B2 | 11/2003 | Choi |
| 6,657,274 B2 | 12/2003 | Comeau et al. |
| 6,720,705 B2 * | 4/2004 | Nakatsuka et al. ..... 310/316.01 |
| 6,756,769 B2 | 6/2004 | Bucur et al. |
| 6,781,325 B2 | 8/2004 | Lee et al. |
| 6,809,938 B2 | 10/2004 | Lin et al. |
| 6,853,047 B1 | 2/2005 | Comeau et al. |
| 6,856,519 B2 | 2/2005 | Lin et al. |
| 6,864,669 B1 | 3/2005 | Bucur |
| 6,870,330 B2 | 3/2005 | Choi |
| 6,873,322 B2 | 3/2005 | Hartular |
| 6,876,157 B2 | 4/2005 | Henry |
| 6,888,338 B1 | 5/2005 | Popescu-Stanesti et al. |
| 6,897,698 B1 | 5/2005 | Gheorghiu et al. |
| 6,900,993 B2 | 5/2005 | Lin et al. |
| 6,906,497 B2 | 6/2005 | Bucur et al. |
| 6,911,786 B2 * | 6/2005 | Qiu ..................... 315/209 PZ |
| 6,936,975 B2 | 8/2005 | Lin et al. |
| 6,946,806 B1 | 9/2005 | Choi |
| 6,979,959 B2 | 12/2005 | Henry |
| 6,999,328 B2 | 2/2006 | Lin |
| 7,023,709 B2 | 4/2006 | Lipcsei et al. |
| 7,057,611 B2 | 6/2006 | Lin et al. |
| 7,061,183 B1 | 6/2006 | Ball |
| 7,075,245 B2 | 7/2006 | Liu |
| 7,095,392 B2 | 8/2006 | Lin |
| 7,112,929 B2 | 9/2006 | Chiou |
| 7,112,943 B2 | 9/2006 | Bucur et al. |
| 7,120,035 B2 | 10/2006 | Lin et al. |
| 7,126,289 B2 | 10/2006 | Lin et al. |
| 7,141,933 B2 | 11/2006 | Ball |
| 7,157,886 B2 | 1/2007 | Agarwal et al. |
| 7,161,309 B2 | 1/2007 | Chiou et al. |
| 7,173,382 B2 | 2/2007 | Ball |
| 7,183,724 B2 | 2/2007 | Ball |
| 7,183,727 B2 | 2/2007 | Ferguson et al. |
| 7,187,139 B2 | 3/2007 | Jin |
| 7,187,140 B2 | 3/2007 | Ball |
| 7,190,123 B2 | 3/2007 | Lee et al. |
| 7,200,017 B2 | 4/2007 | Lin |
| 2002/0180380 A1 | 12/2002 | Lin |
| 2005/0030776 A1 | 2/2005 | Lin |
| 2005/0093471 A1 | 5/2005 | Jin |
| 2005/0093482 A1 | 5/2005 | Ball |
| 2005/0093484 A1 | 5/2005 | Ball |
| 2005/0151716 A1 | 7/2005 | Lin |
| 2005/0174818 A1 | 8/2005 | Lin et al. |
| 2005/0225261 A1 | 10/2005 | Jin |
| 2006/0202635 A1 | 9/2006 | Liu |
| 2006/0232222 A1 | 10/2006 | Liu et al. |
| 2006/0279521 A1 | 12/2006 | Lin |
| 2007/0001627 A1 | 1/2007 | Lin et al. |
| 2007/0046217 A1 | 3/2007 | Liu |
| 2007/0047276 A1 | 3/2007 | Lin et al. |
| 2007/0085493 A1 | 4/2007 | Kuo et al. |
| 2008/0136343 A1 * | 6/2008 | Yu et al. ..................... 315/219 |

OTHER PUBLICATIONS

Zhou, Jinghai, Fengfeng Tao, Fred C. Lee, "Inductor-Less Charge Pump PFC Electronic Ballast", 2001 IEEE Industry Application Conference, pp. 524-529.

Sanz, M., P. Alou, R. Prieto, J.A. Cobos, and J.Uceda, "Comparison of Different Alternatives to Drive Piezoelectric Transformers", IEEE APEC'02, pp. 358-364.

Lin, Ray-Lee, "Piezoelectric Transformer Characterization and Application of Electronic Ballast", VT Ph.D thesis, Nov. 2001, 16 pages.

Kakehashi, Hidenori, Takayuki Hidaka, Tamotsu Ninomiya, Masahito Shoyama, Hiroshi Ogasawara, Yukihiko Ohta, "Electronic Ballast Using Piezoelectric Transformers for Fluorescent Lamps," Proceedings of IEEE PESC'98, pp. 29-35.

* cited by examiner

Buck converter

Boost converter

Buck-Boost converter

Full bridge

Conventional Half bridge

Half bridge with capacitor in series

DA/AC CONVERT FOR DRIVING COLD CATHODE FLUORESCENT LAMP

CROSS REFERENCE TO RELATED APPLICATIONS

This application claims priority from Chinese patent application No. 200510114121.X, filed Oct. 17, 2005, to which the benefit of priority is claimed.

TECHNICAL FIELD

The present invention relates to DC to AC processing, and in particular, relates to a system that includes a DC/AC converter.

BACKGROUND INFORMATION

A DC/AC converter (also known as an inverter) is commonly used in cold cathode fluorescent lamp (CCFL) applications, especially in the backlight of flat panel displays. Typically, an AC voltage used to ignite or strike a CCFL is about three times higher than that under normal operation conditions (about 300V to 600V).

Many portable devices, such as laptops, are powered by a battery (a DC source), which requires a special DC/AC converter to power the CCFL. The input voltage from a DC battery has a wide voltage range, such as 7.5V-21V, 5V-12V, etc., due to the battery's charging and discharging. Furthermore, since the backlight inverter consumes a large part of the system's total power, it greatly affects the battery's discharge time and the system's cost. Finally, the continuous trend of reducing the portable devices' size and weight has also challenged the volume of the backlight inverter. It is desired to have a small size DC/AC inverter with high efficiency capable of handling a wide range of input voltages.

Traditionally, CCFL backlight systems use magnetic transformers, which require special attention to issues such as EMI noise and voltage tolerance etc. Also, magnetic transformers are limited in their sizes and heights, which are big disadvantages in the development of lighter and thinner portable devices. In contrast, a piezoelectric transformer (PT) uses a piezoelectric transduction technique and has much less EMI noise and voltage issues than those in a traditional magnetic transformer. Additionally, the size and height of piezoelectric transformer is much smaller than that of a traditional magnetic transformer with an equivalent power rating. Therefore, piezoelectric transformers have become widely used in the CCFL backlight system.

A system with a piezoelectric transformer can achieve high step-up ratio and shown in FIG. 1. When the operating frequency deviates from the inherent resonant frequency, the step-up ratio of the piezoelectric transformer, as well as its efficiency, decreases. In order to achieve constant lamp current with a wide range of input voltages, a backlight system with piezoelectric transformers normally adjusts their outputs by varying its switching frequency. When the input voltage of the piezoelectric transformer increases, the switching frequency increases from point A to point B, which is illustrated in FIG. 1. Therefore, the step-up ratio decreases to keep the output voltage constant. With a wide range of input voltages, it is almost impossible for the system to achieve high efficiency. The transformer's efficiency decreases as the input voltage increases. The wider the range of the input voltages, the bigger the range the transformer's efficiency varies.

BRIEF DESCRIPTION OF DRAWINGS

The following figures illustrate embodiments of the invention. These figures and embodiments provide examples of the invention and they are non-limiting and non-exhaustive.

DETAILED DESCRIPTION

Embodiments of a system and method that uses a DC/AC converter and accompanying circuitry to achieve highly efficient DC to AC conversion are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with systems, circuits, and methods that are meant to be exemplary and illustrative. In various embodiments, the above problem has been reduced or eliminated, while other embodiments are directed to other improvements.

The present invention relates to circuits and methods of high efficient DC to AC conversion with a wide range of input voltages.

Figure 1:
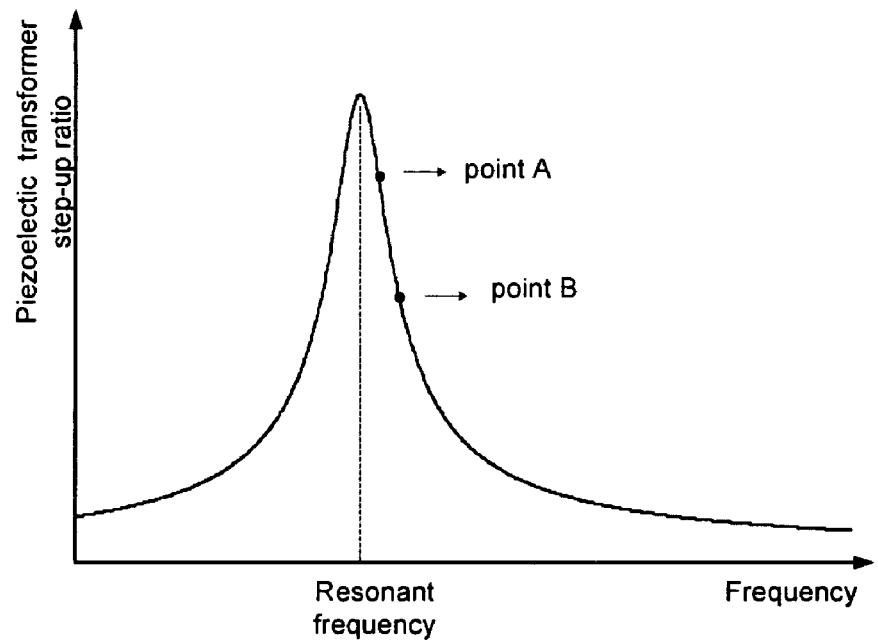
FIG. 1 illustrates voltage gain versus frequency of a typical piezoelectric transformer.
Figure 2:
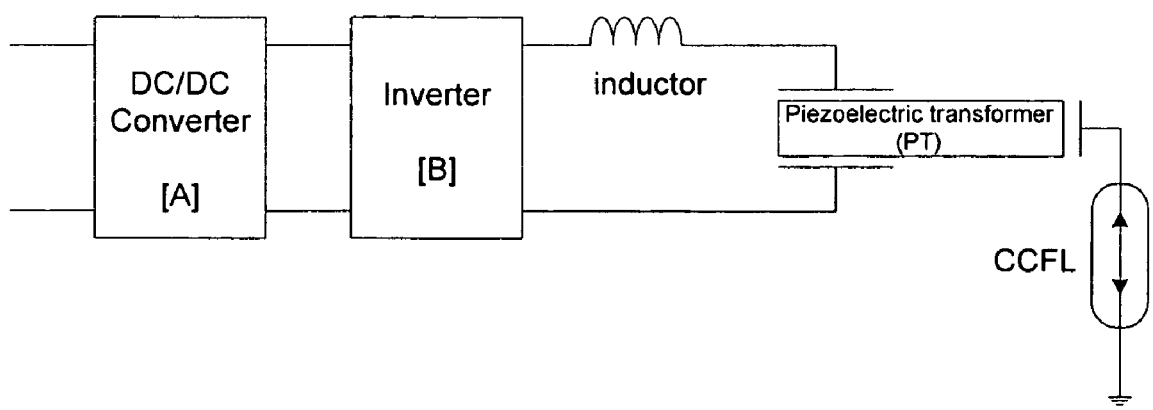
FIG. 2 illustrates a block diagram of a DC/AC converter system, in accordance with one embodiment.
Figure 3A:
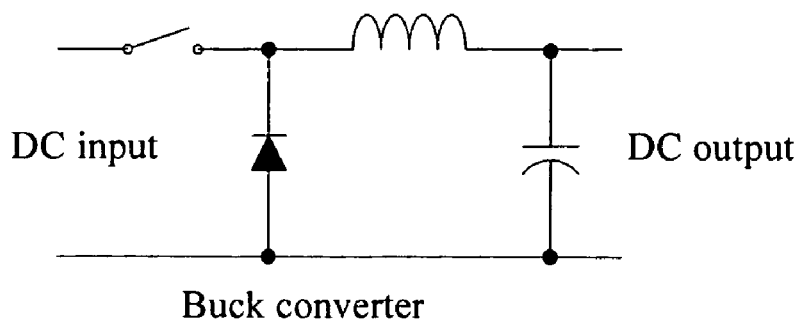
FIG. 3A illustrates a circuit diagram of a buck type DC/DC converter [A], in accordance with another embodiment.
Figure 3B:
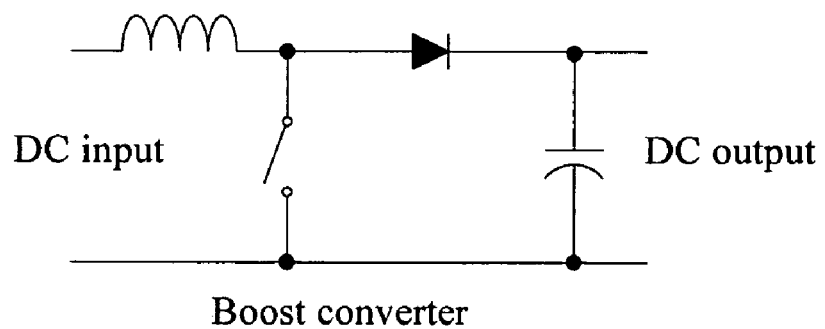
FIG. 3B illustrates a circuit diagram of a boost type DC/DC converter [A], in accordance with another embodiment.
Figure 3C:
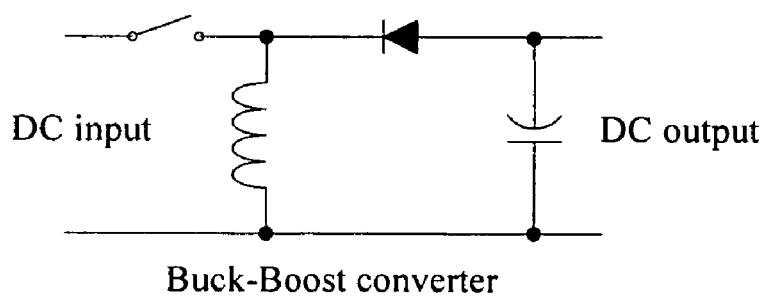
FIG. 3C illustrates a circuit diagram of a buck-boost type DC/DC converter [A], in accordance with another embodiment.

FIG. 2 illustrates a block diagram of a DC/AC converter system. The DC/AC converter system comprises a front end DC/DC converter, an inverter, an inductor and a piezoelectric transformer. According to one embodiment of the present invention, the front end DC/DC converter comprises a switch, an inductor, a diode, and a capacitor. The front end DC/DC converter can be either a buck converter, or a boost converter, or a buck-boost converter which is illustrated in FIG. 3A, FIG. 3B, and FIG. 3C, respectively. The switching devices in FIG. 3A, 3B, and 3C can be MOSFET, bipolar transistor or other type of switching devices. The input of the front end DC/DC converter [A] is connected to a DC input of the system that can have a wide range of voltages. Through a voltage feedback control, the output voltage of the front end DC/DC converter [A] is set to a predetermined value or a value with a predetermined small range.

Figure 4A:
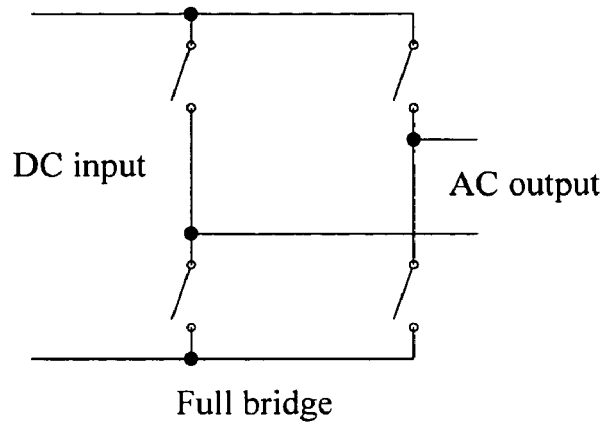
FIG. 4A illustrates a schematic diagram of a full bridge inverter [B], in accordance with another embodiment.
Figure 4B:
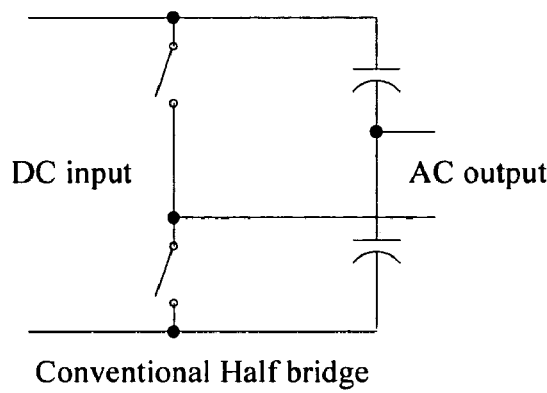
FIG. 4B illustrates a schematic diagram of a half bridge inverter [B], in accordance with another embodiment.
Figure 4C:
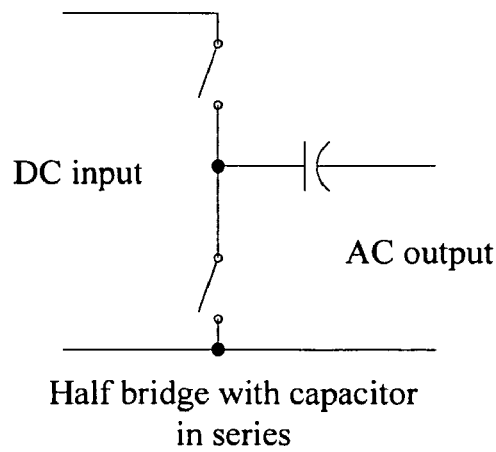
FIG. 4C illustrates a schematic diagram of a half bridge inverter with capacitor in series [B], in accordance with another embodiment.

The output terminals of the front end DC/DC converter are connected to the input terminals of the inverter. One output terminal of the inverter is connected to one terminal of the piezoelectric transformer [PT] through an inductor and the other output terminal of the inverter is connected to the other terminal of PT. The output terminals of the piezoelectric transformer are coupled directly to a load, such as a CCFL. In another embodiment of the invention, the inverter can have a full bridge topology, or a conventional half bridge topology, or a half bridge topology in series with a capacitor, which are illustrated in FIG. 4A, 4B, and 4C, respectively.

Figure 5:
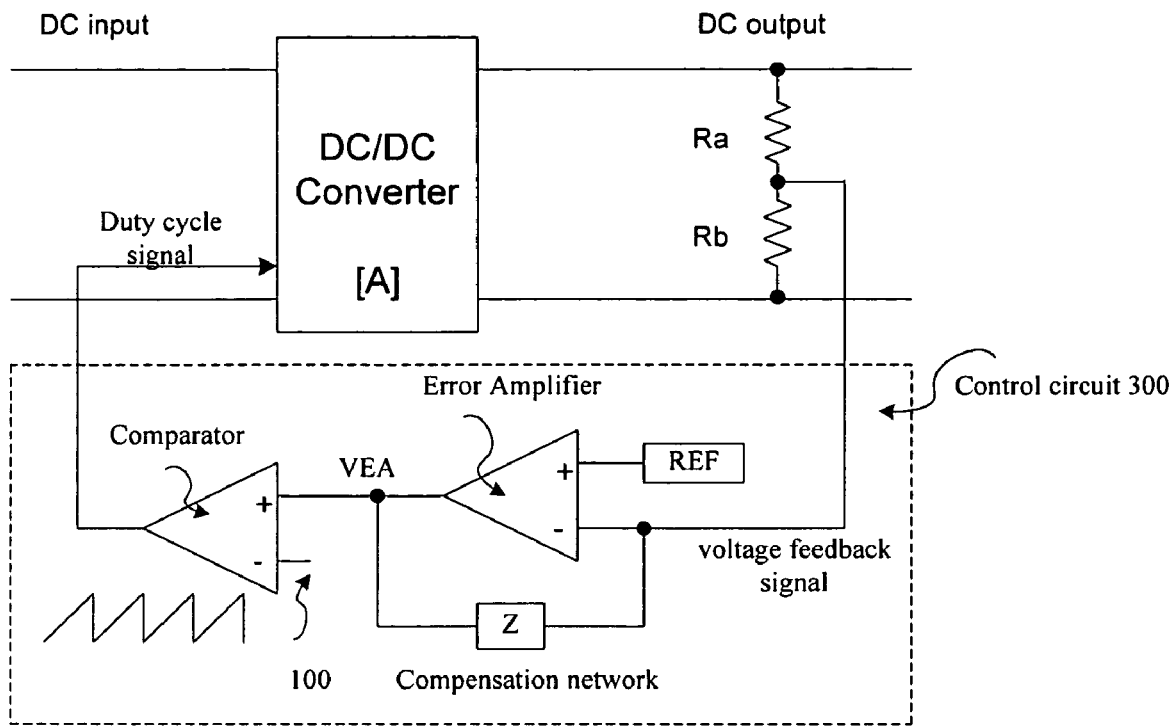
FIG. 5 illustrates an example of a voltage feedback control schematic diagram for front end DC/DC converter [A], in accordance with another embodiment.
Figure 6:
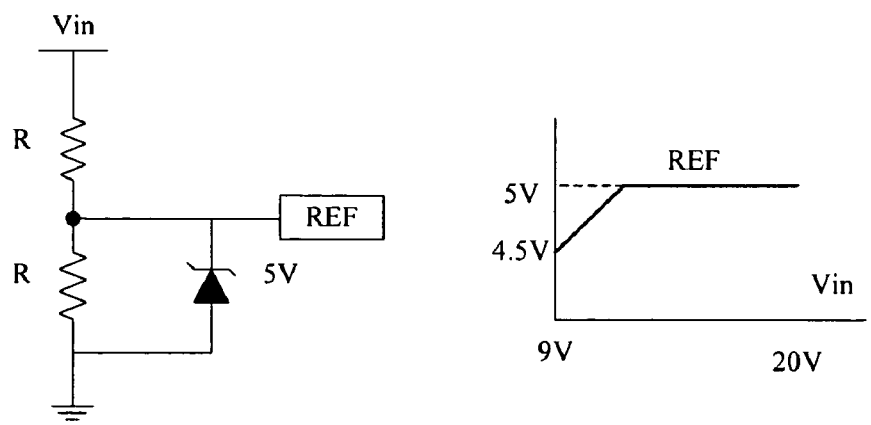
FIG. 6 illustrates an example of a reference voltage REF generating method according to the input voltage, in accordance with another embodiment.

FIG. 5 illustrates an example of the voltage feedback control in a PWM DC/DC converter. The DC output voltage of front end DC/DC converter [A] is sensed through a voltage divider with two resistors, Ra and Rb, to generate a voltage feedback signal. The voltage feedback signal is coupled to an error amplifier that compares the voltage feedback signal to a voltage reference REF. The error amplifier's output signal VEA is coupled to a comparator that compares VEA with a signal 100. The output of the comparator, which is the required duty cycle signal, controls the switching of the front end DC/DC converter. The signal 100 can be a sawtooth waveform for voltage mode control or a sensed current waveform for a typical current mode control. With negative voltage feedback control, the output voltage of the front end DC/DC converter is determined by the reference voltage REF. When REF is a fixed value the output voltage is set to a predetermined value. When REF has small variations, the output voltage varies in a predetermined small range. For example, if the input voltage range is from 9V to 20V, the output voltage can be either set to 20V, or set between 18V and 20V, depending on the voltage sensing divider Ra, Rb and the reference voltage REF. In another embodiment of the present invention, the REF can vary in a small voltage range, as shown in FIG. 6. When the input voltage Vin is larger than 10V, the 5V zener diode is active and the reference voltage REF is clamped to 5V. When the input voltage Vin is less than 10V, the 5V zener diode is inactive and the reference voltage REF equals to Vin/2. If the input voltage varies between 9V and 10V, the reference ranges from 4.5V to 5V according to the input voltage.

In another embodiment of the present invention, the output voltage with a predetermined small range can also be achieved even with a fixed reference voltage. For example, in a Boost converter, if the close loop output voltage is set to a predetermined output value that is less than the maximum input voltage, the output voltage is the predetermined output value when the input voltage is less than the predetermined output value. When the input voltage is higher than the predetermined output value, the output voltage follows the input voltage. Therefore, within the input voltage range, the output voltage varies between the predetermined output value and the maximum input voltage value.

In accordance with another embodiment of the present invention, the electrical power delivered to the load is regulated through an inverter control circuit by using either pulse duty cycle modulation or pulse amplitude modulation (PAM) methods. An example of the control circuit 200 together with a full bridge inverter is illustrated in FIG. 7.

Figure 7:
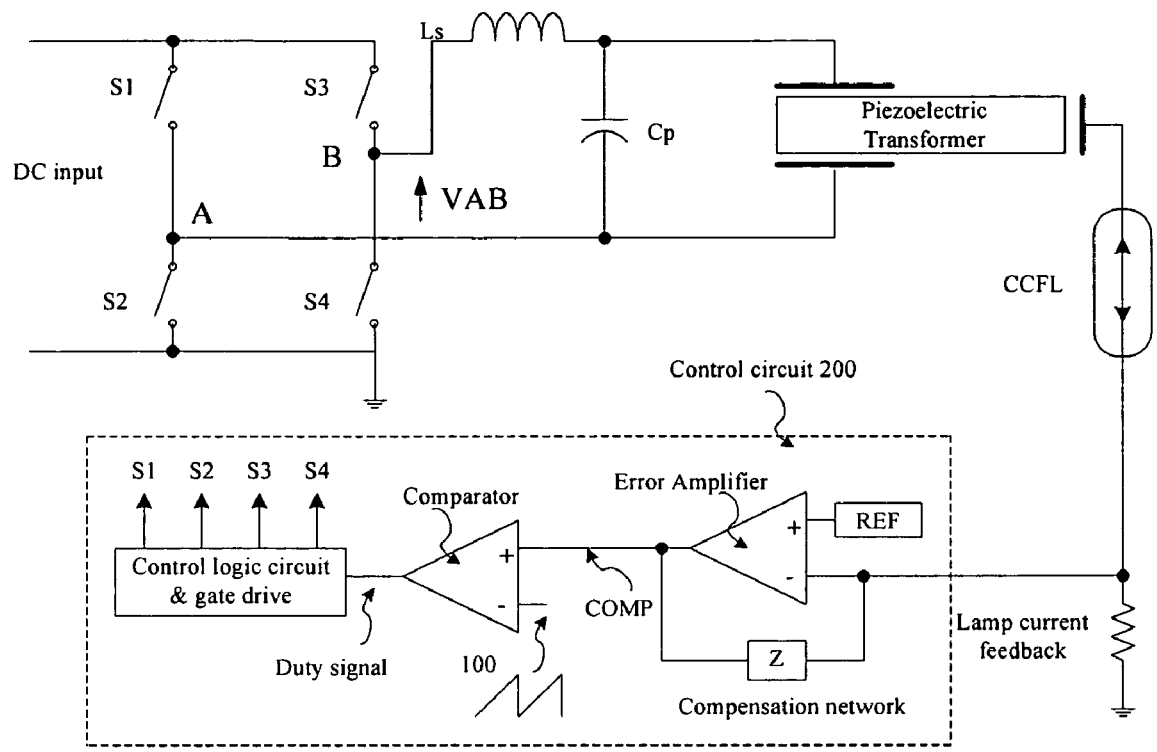
FIG. 7 illustrates a schematic diagram of a control circuit, together with a full bridge inverter, in accordance with still another embodiment.
Figure 8:
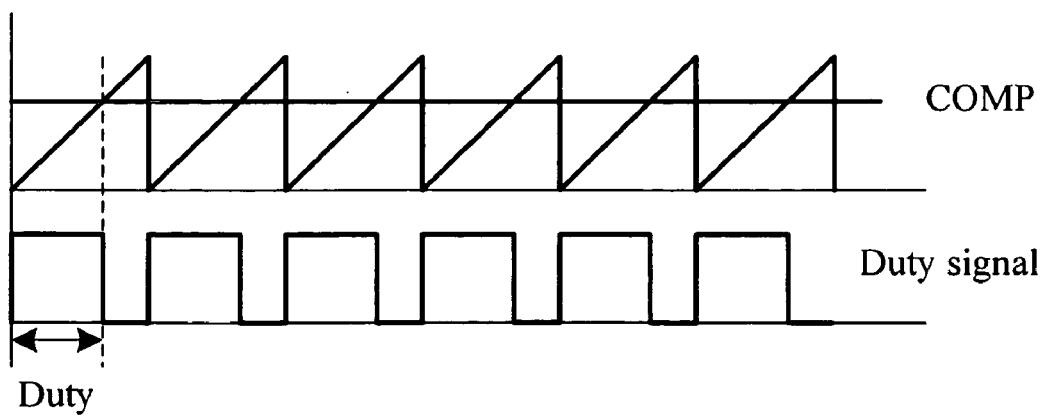
FIG. 8 illustrates a pulse duty cycle modulation diagram of the circuit in FIG. 7.
Figure 9:
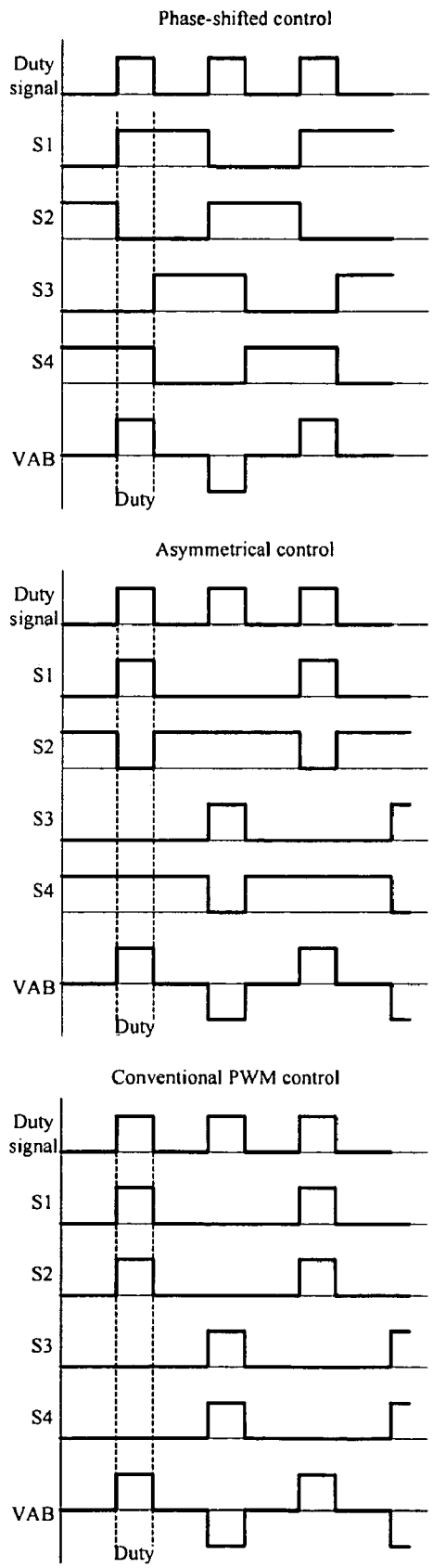
FIG. 9 illustrates three gate control/drive schemes with a full bridge topology, in accordance with still another embodiment.

In FIG. 7, the AC signal generated by the inverter is applied to both terminals of the piezoelectric transformer [PT] through an inductor in series. The duty cycle of the AC signal can be modulated to regulate the power being delivered to the load. The primary side capacitor Cp is optional due to the parasitic capacitance of piezoelectric transformer [PT]. A compensation network Z is sometimes required for the error amplifier output COMP to stabilize the system. The inverter pulse duty cycle control circuit 200 is coupled to a lamp current feedback signal that represents lamps currents or lamp voltages. If the lamp current is larger than the reference signal REF, the error amplifier's output COMP decreases, which reduces the duty cycle signal. The modulation method of the circuit in FIG. 7 is illustrated in FIG. 8. When COMP decreases, the duty cycle decreases and the power being delivered to the load also decreases. The duty signal is coupled to a control logic circuit that generates gate drive signals for four switches S1, S2, S3 and S4 of the inverter. FIG. 9 illustrates three gate drive schemes to achieve required duty cycles, phase-shifted control scheme, asymmetrical control scheme, and the conventional PWM control scheme, respectively. For simplicity, the dead time between the up and low side switches in one leg to prevent simultaneous turning on of both switches is not shown in FIG. 9. In another embodiment of the present invention, the power being delivered to the load is regulated by modulating the duty cycle of the inverter stage only.

Figure 10:
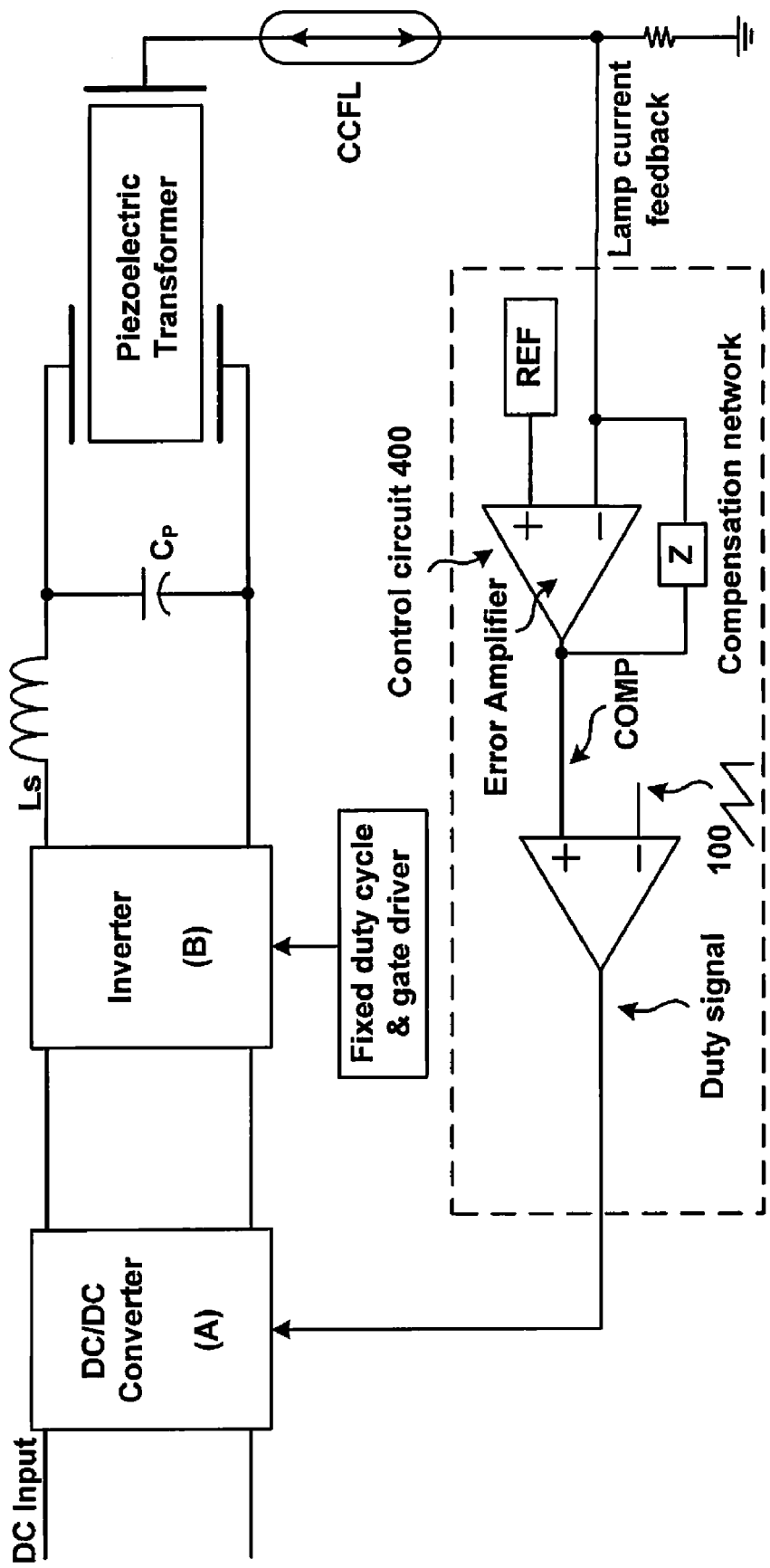
FIG. 10 illustrates a control scheme with a fixed duty cycle in the inverter, in accordance with still another embodiment.

In still another embodiment of the present invention, the duty cycle of the inverter stage is fixed. An inverter pulse amplitude control circuit regulates the front end DC/DC converter and control the power being delivered to the load. FIG. 10 illustrates a control block diagram with the inverter pulse amplitude control circuit 400 and a load current feedback signal. If the load current is larger than reference signal REF, the error amplifier output signal COMP decreases, which reduces the duty cycle signal. As a result, the output voltage of the front end DC/DC converter also decreases. Since the front end DC/DC converter's output voltage is used as the inverter's input voltage and the amplitude of AC signal generated by the inverter is proportional to the inverter's input voltage, the control circuit, together with the load current feedback signal, regulates the amplitude of the AC signal and the power being delivered to the load. This method is a PAM modulation method. In another embodiment of the present invention, the control method for the DC/DC converter can be either using fixed frequency or variable frequency, or other control methods commonly available.

Figure 11:
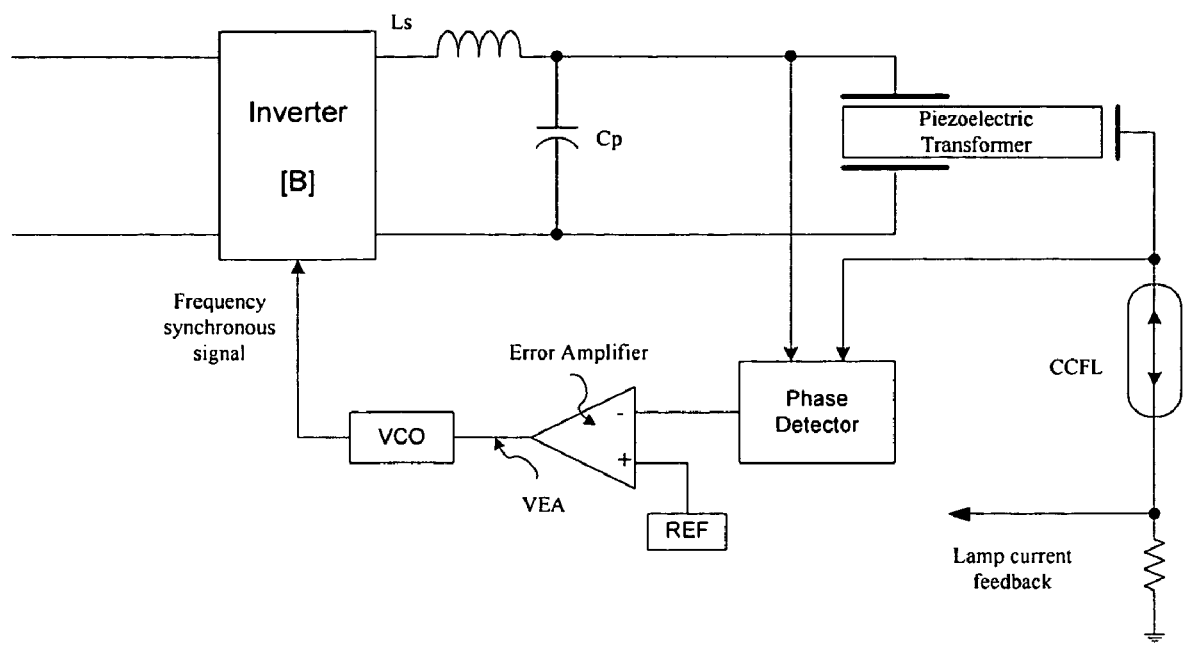
FIG. 11 illustrates a scheme diagram for monitoring and optimizing the operating frequency of the inverter, in accordance with still another embodiment.

Typically, the efficiency of the piezoelectric transformer [PT] depends on the operating frequency of the system. The optimized efficiency occurs close to the main resonant frequency of the piezoelectric transformer [PT]. However, the resonant frequency can be affected by the load condition and environmental temperature. In some applications, the load and the ambient temperature vary in a wide range. It is preferred to track the resonant frequency in order to optimize the PT's efficiency. FIG. 11 illustrates a scheme diagram for monitoring and optimizing the operating frequency of the inverter, in which a driving pulse frequency control section comprises a phase detector, an error amplifier and a voltage controlled oscillator (VCO). In FIG. 11, the phase difference between PT's input voltage and output voltage is detected by the phase detector. The error amplifier compares the output signal of the phase detector with a reference voltage and determines the phase difference between PT's input and output voltage signals. Since the input signal and the output signal has a fixed phase relationship at the resonant frequency, the error amplifier's output signal VEA is used to control the voltage controlled oscillator (VCO). The output frequency of VCO is the resonant frequency of the piezoelectric transformer [PT], which is used as a synchronous signal for the inverter. Therefore, the switching frequency of the inverter is fine-tuned in according with the optimized resonant frequency of the piezoelectric transformer [PT].

In the present invention, a DC/AC converter with high efficiency is introduced. The DC/AC converter comprises a front end DC/DC converter [A], an inverter [B], a piezoelectric transformer [PT] and an inductor. In one embodiment of the present invention, the front end DC/DC converter contains a voltage feedback control circuit. The front end DC/DC converter converts a wide range of input voltages to a predetermined value or with a predetermined small range; hence help the DC/AC converter achieve a simplified structure and high efficiency. In another embodiment of the present invention, the electrical power delivered to a load is regulated through an inverter pulse duty cycle control circuit and the inverter. The inverter pulse duty cycle control circuit modulates the duty cycle of the inverter and is coupled to a load feedback signal that represents either load currents or load voltages. In another embodiment of the present invention, the inverter has a fixed duty cycle and the power delivered to the load is regulated by the front end DC/DC converter and an inverter pulse amplitude control circuit. In yet another embodiment of the present invention, the switching frequency of the inverter is regulated in according to the optimized resonant frequency of PT. And, the phase difference of PT's input and output voltages is compared and monitored.

The DC/AC converter system with the present invention can be applied in applications with a wide range of input voltages and improve the overall efficiency of a backlight power supply system. Since the front end DC/DC converter's output voltage is stabilized and is used as an input voltage for the inverter, the range of input voltages to the front end DC/DC converter can be widened without significantly sacrificing the inverter's conversion efficiency. Therefore, the DC/AC converter system can be applied in much wider application fields than a traditional system. The combination of the system's advantages, such as having a wide range of input voltages and requiring only one type of piezoelectric transformer in different type of applications etc., allows the system to be applied in even wider application fields and have lower system costs through standardization and mass production.

The description of the invention and its applications as set forth herein is illustrative and is not intended to limit the scope of the invention. Variations and modifications of the embodiments disclosed herein are possible, and practical alternatives to and equivalents of the various elements of the embodiments are known to those of ordinary skill in the art. Other variations and modifications of the embodiments disclosed herein may be made without departing from the scope and spirit of the invention.

We claim:

1. A backlight power supply system, comprising:
    a front end DC/DC converter to receive a wide range of input voltages and provide a DC voltage that has a predetermined small range wherein a front end DC/DC converter control circuit receives a voltage feedback signal representing the DC voltage and sends a duty cycle signal to the front end DC/DC converter;
    an inverter to receive the DC voltage and convert the DC voltage to a pulse voltage;
    a piezoelectric transformer (PT) to receive the pulse voltage and drive a load; and
    a driving pulse frequency control section, wherein a phase difference between the input voltage and output voltage of the PT is detected and compared, so that the PT's optimized operating frequency is monitored and the inverter's modulation frequency is exclusively tuned by the driving pulse frequency control section according to the monitored PT's optimized operating frequency.

2. The system in claim 1, wherein the front end DC/DC converter is a buck, boost, or buck-boost DC/DC converter.

3. The system in claim 1, wherein the inverter has a full bridge topology or a half bridge topology.

4. The system in claim 1, wherein the driving pulse frequency control section further comprises a phase detector that compares the phase difference between PT's input voltage and output voltage, an error amplifier that compares the phase difference with a reference voltage, and a voltage controlled oscillator (VCO) that is controlled by the error amplifier's output signal and generates a synchronous signal for the inverter.

5. The system in claim 1, wherein the structure of the piezoelectric transformer is either symmetrical or asymmetrical.

6. The system in claim 1, wherein the voltage feedback signal is generated by sensing the DC voltage through a resistor divider, and the front end DC/DC converter control circuit comprises an error amplifier that compares the voltage feedback signal with a reference voltage, and a comparator that compares the error amplifier's output signal with a sawtooth signal and generates the duty cycle signal for the front end DC/DC converter.

7. The system in claim 6, wherein the front end DC/DC converter control circuit further comprises a compensation network.

8. The system in claim 1, wherein a duty cycle of the inverter is fixed, and an inverter pulse amplitude control circuit receives a load feedback signal that represents either load currents or load voltages and regulates the front end DC/DC converter to control the power being delivered to the load.

9. The system in claim 8, wherein the inverter pulse amplitude control circuit comprises an error amplifier that compares the load feedback signal with a reference voltage, and a comparator that compares the error amplifier's output signal with a sawtoothed signal and generates a duty cycle signal for the front end DC/DC converter.

10. The system in claim 9, wherein the inverter pulse amplitude control circuit further comprises a compensation network.

11. The system in claim 1, wherein the inverter uses a control method of pulse duty cycle modulation or a pulse amplitude modulation.

12. The system in claim 11, wherein an inverter pulse duty cycle control circuit receives a load feedback signal that represents either the load currents or load voltages and modulates the inverter to control the power being delivered to the load.

13. The system in claim 12, wherein the inverter pulse duty cycle control circuit comprises an error amplifier that compares the load feedback signal with a reference voltage, a comparator that compares the error amplifier's output signal with a sawtooth signal, and a control logic circuit that receives the comparator's output signal and generates gate drive signals for the switches of the inverter.

14. The system in claim 13, wherein the gate drive signals are generated through either phase-shifted control, or asymmetric control, or conventional pulse width modulation (PWM) control.

15. The system in claim 14, wherein the inverter pulse duty cycle control circuit further comprises a compensation network.

16. A method for driving a backlight system that includes a front end DC/DC converter, a front end DC/DC converter control circuit, an inverter, a piezoelectric transformer (PT), comprising:
   providing an input voltage to the front end DC/DC converter;
   converting the input voltage to a DC voltage with a receiving a voltage feedback signal representing the DC voltage and sending a duty cycle signal to the front end DC/DC converter through the front end DC/DC converter control circuit;
   predetermined small range through the front end DC/DC converter;
   providing the DC voltage to the inverter;
   converting the DC voltage to a pulse voltage through the inverter; and
   providing the pulse voltage to the PT that drives a load, wherein a phase difference between the input voltage and output voltage of the PT is detected and compared, so that the PT's optimized operating frequency is monitored and the frequency of the pulse voltage is exclusively tuned by a driving pulse frequency control section according to the monitored PT's optimized operating frequency.

17. The method in claim 16, wherein the front end DC/DC converter is a buck, boost, or buck-boost DC/DC converter.

18. The method in claim 16, wherein the inverter has a full bridge topology or a half bridge topology.

19. The method in claim 16, wherein the driving pulse frequency control section further comprises a phase detector that compares the phase difference between PT's input voltage and output voltage, an error amplifier that compares the phase difference with a reference voltage, and a voltage controlled oscillator (VCO) that is controlled by the error amplifier's output signal and generates a synchronous signal for the inverter.

20. The method in claim 16, wherein the structure of the piezoelectric transformer is either symmetrical or asymmetrical.

21. The method in claim 16, wherein the voltage feedback signal is generated by sensing the DC voltage through a resistor divider and the front end DC/DC converter control circuit comprises an error amplifier that compares the voltage feedback signal with a reference voltage, and a comparator that compares the error amplifier's output signal with a sawtooth signal and generates the duty cycle signal for the Front end DC/DC converter.

22. The method in claim 21, wherein the front end DC/DC converter control circuit further comprises a compensation network.

23. The method in claim 16, further comprising receiving a load feedback signal that represents either load currents or load voltages and regulating the front end DC/DC converter to control the power being delivered to the load through an inverter pulse amplitude control circuit, wherein the duty cycle of the inverter is fixed.

24. The method in claim 23, wherein the inverter pulse amplitude control circuit comprises an error amplifier that compares the load feedback signal with a reference voltage, and a comparator that compares the error amplifier's output signal with a sawtooth signal and produces a duty cycle signal for the front end DC/DC converter.

25. The method in claim 24, wherein the inverter pulse amplitude control circuit further comprises a compensation network.

26. The method in claim 16, wherein the inverter uses a control method of pulse duty cycle modulation or pulse amplitude modulation.

27. The method in claim 26, further comprising receiving a load feedback signal that represents either the load currents or load voltages and modulating the inverter to control the power being delivered to the load through an inverter pulse duty cycle control circuit.

28. The method in claim 27, wherein the inverter pulse duty cycle control circuit comprises an error amplifier that compares the load feedback signal with a reference voltage, a comparator that compares the error amplifier's output signal with a sawtoothed signal, and a control logic circuit that receives the comparator's output signal and generates gate drive signals for the switches of the inverter.

29. The method in claim 28, wherein the gate drive signals are generated through either phase-shifted control, or asymmetric control, or conventional pulse width modulation (PWM) control.

30. The method in claim 29, wherein the inverter pulse duty cycle control circuit further comprises a compensation network.

* * * * *